United States Patent
Rutherford

(10) Patent No.: US 6,182,946 B1
(45) Date of Patent: Feb. 6, 2001

(54) TREE STAND HOIST ASSEMBLY AND CASING THEREFOR HAVING IDENTICAL MATING HALVES

(76) Inventor: Darin Rutherford, 5205 S. Walnut, Muncie, IN (US) 47302

(*) Notice: Under 35 U.S.C. 154(b), the term of this patent shall be extended for 0 days.

(21) Appl. No.: 09/313,095

(22) Filed: May 17, 1999

(51) Int. Cl.[7] .................................................. B66D 3/04
(52) U.S. Cl. ...................................... 254/391; 254/409
(58) Field of Search .................................. 254/391, 405, 254/409, DIG. 12

(56) References Cited

U.S. PATENT DOCUMENTS

| | | | |
|---|---|---|---|
| 210,281 | * 11/1878 | Weston | 254/391 X |
| 723,231 | 3/1903 | Benedict . | |
| 1,107,934 | 8/1914 | Hagan . | |
| 1,167,295 | 1/1916 | Hall . | |
| 1,243,107 | 10/1917 | Richardson . | |
| 1,389,514 | * 8/1921 | Kestell | 254/391 |
| 1,399,182 | 12/1921 | Benedict . | |
| 1,753,084 | * 4/1930 | Kappel | 254/405 |
| 1,961,081 | 5/1934 | Schrader | 24/134 |
| 2,292,353 | 8/1942 | Ennis et al. | 212/61 |
| 2,532,893 | 12/1950 | Crotty | 254/192 |
| 3,313,526 | * 4/1967 | Owens | 254/391 |
| 3,756,565 | * 9/1973 | Sakai | 254/391 |
| 4,097,023 | 6/1978 | Muller | 254/156 |
| 4,173,332 | * 11/1979 | DuLondel | 254/391 |
| 4,533,026 | * 8/1985 | Bernard | 254/391 X |
| 5,603,489 | 2/1997 | Regal | 254/378 |
| 5,607,143 | 3/1997 | Regal | 254/324 |
| 5,615,865 | 4/1997 | Fountain | 254/391 |
| 5,845,894 | * 12/1998 | Petzi et al. | 254/391 |
| 5,868,380 | * 2/1999 | Allen | 254/391 |

FOREIGN PATENT DOCUMENTS

1450018 * 7/1966 (FR) .................................... 254/391

* cited by examiner

Primary Examiner—Donald P. Walsh
Assistant Examiner—Emmanuel M. Marcelo
(74) Attorney, Agent, or Firm—Flanagan & Flanagan; John K. Flanagan; John R. Flanagan

(57) ABSTRACT

A hoist assembly includes a casing, a pulley mechanism and a latch mechanism. The casing has a pair of identical mating front and rear casing halves. The casing has an aperture formed therethrough and an interior chamber formed therein between said front and rear casing halves. The aperture receives a fastener member therethrough for supporting the casing on a tree at a predetermined height. The casing also has a centering recess formed therethrough in communication with the aperture for receiving a portion of the fastener member therein for balancing the casing thereon. The pulley mechanism includes a pulley and a cable. The pulley is rotatably mounted to and disposed within the interior chamber of the casing. The cable is entrained about the pulley and extends downwardly through the interior chamber and spaced apart openings defined at a lower end of the casing to exteriorly of the casing. A first opposite end portion of the cable is for attachment of an item thereto and the second opposite end portion of the cable is for a user to grip for pulling the second opposite end portion downward to thereby raise the item attached to the first opposite end portion. The latch mechanism includes a latching pawl pivotally mounted to and disposed within the interior chamber of the casing and being movable between a locked position and an unlocked position relative to the cable on the pulley. The latching pin is for moving the latching pawl between the locked and unlocked positions.

34 Claims, 3 Drawing Sheets

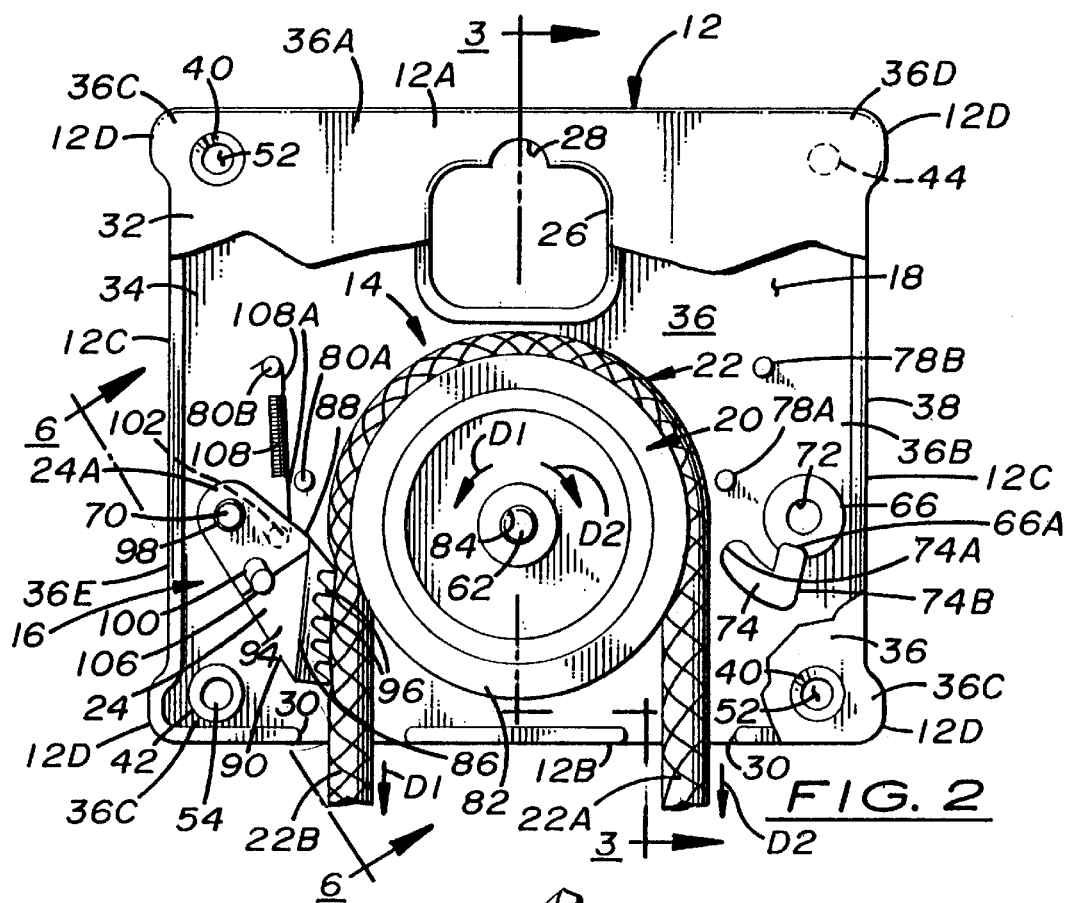
FIG. 2
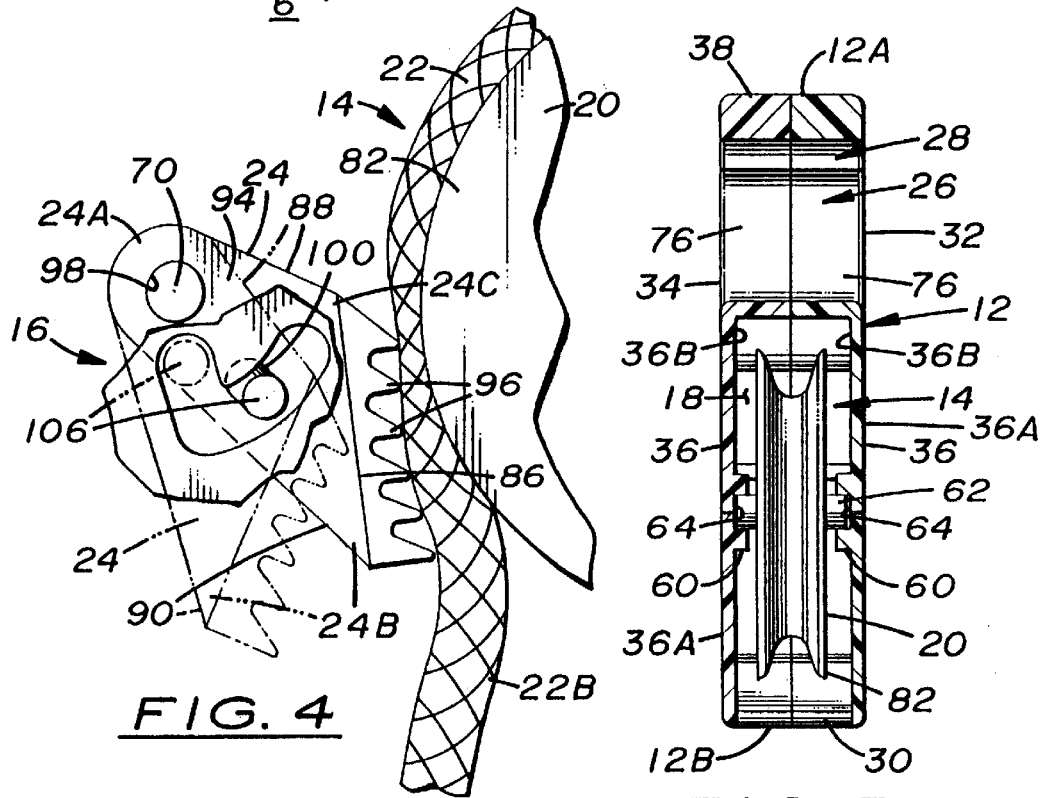
FIG. 4
FIG. 3

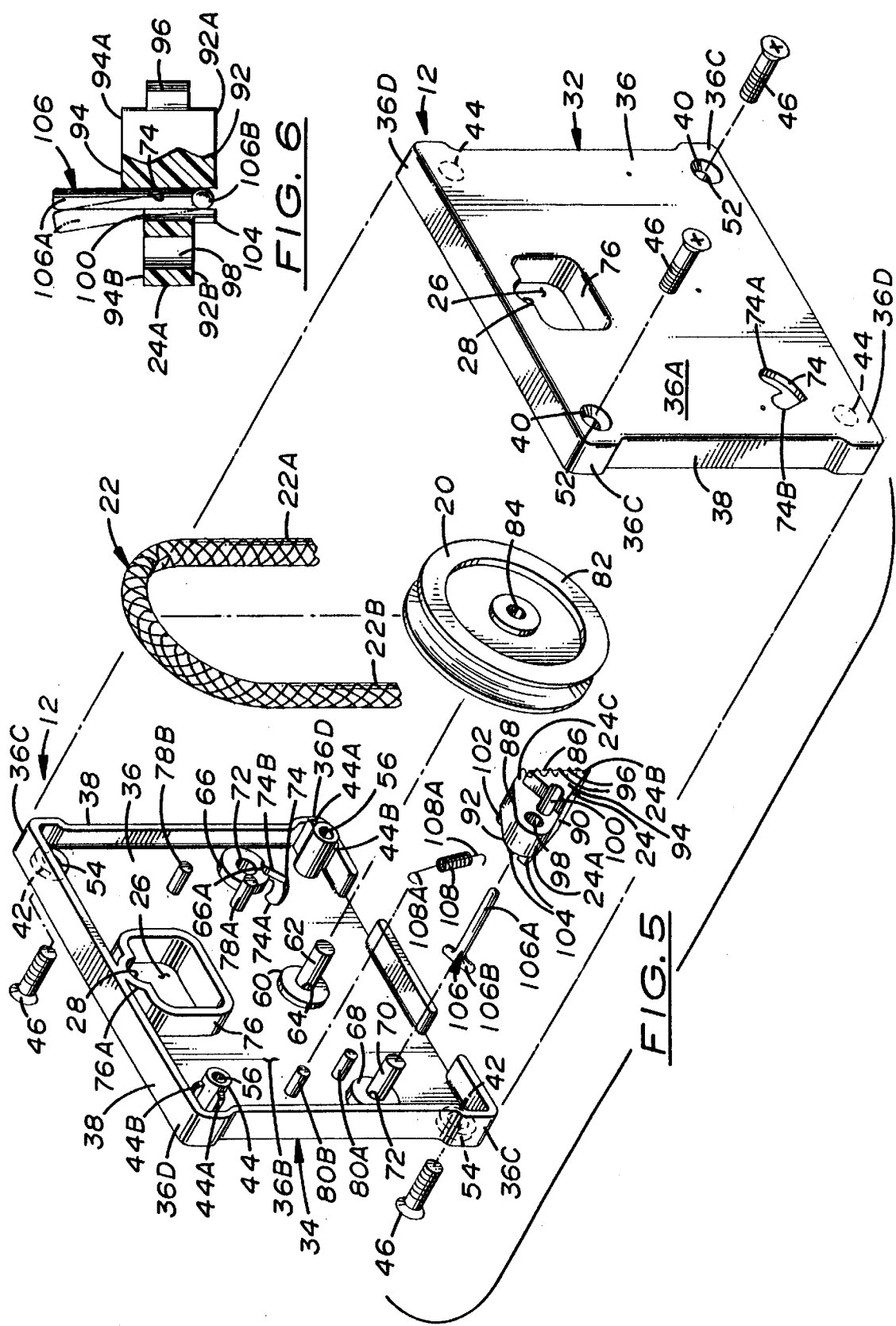

TREE STAND HOIST ASSEMBLY AND CASING THEREFOR HAVING IDENTICAL MATING HALVES

BACKGROUND OF THE INVENTION

1. Field of the Invention

The present invention generally relates to pulley mechanisms and, more particularly, is concerned with a tree stand hoist assembly and a casing therefor having identical mating casing halves.

2. Description of the Prior Art

Hunting wild game is a popular activity. Hunters often find it useful to position themselves above the ground, such as on trees. Tree stands are employed for this purpose. Hunters are less likely to be spotted or scented by game and have a better view of the surrounding terrain at elevated positions. A challenge for hunters, however, is getting a tree stand and other items on a tree at a desired position above the ground. Tree stands generally may be constructed on a tree, may be used in climbing the tree or may be raised onto the tree.

Various devices have been developed over the years for raising items, such as tree stands and the like, to higher elevations. Representative examples of prior art pulley mechanisms and the like are disclosed in U.S. Pat. No. 723,231 to Benedict, U.S. Pat. No. 1,107,934 to Hagan, U.S. Pat. No. 1,167,295 to Hall, U.S. Pat. No. 1,243,107 to Richardson, U.S. Pat. No. 1,399,182 to Benedict, U.S. Pat. No. 1,961,081 to Schrader, U.S. Pat. No. 2,292,353 to Ennis et al., U.S. Pat. No. 2,532,893 to Crotty, U.S. Pat. No. 4,097,023 to Muller, U.S. Pat. No. 5,603,489 to Regal, U.S. Pat. No. 5,607,143 to Regal and U.S. Pat. No. 5,615,865 to Fountain. While these prior art devices may be satisfactory in use for the specific purposes for which they were designed, none of them seem to provide a simple and effective solution for raising tree stands and the like to desired elevated positions.

Consequently, a need still exists for an assembly which provides an optimum solution to the aforementioned problem in the prior art without introducing any new problems in place thereof.

SUMMARY OF THE INVENTION

The present invention provides a tree stand hoist assembly and a casing therefor designed to satisfy the aforementioned need. The hoist assembly of the present invention employs a casing, a pulley mechanism and a latch mechanism to assist a hunter in raising a tree stand or any other suitable item, such as game, to a desired elevation on a tree. The casing of the present invention has an aperture for receiving a fastener member, such as a hanger, hook, peg, step and the like, therethrough for supporting the casing on a tree at a predetermined height. The casing also employs identical mating halves for efficiency and cost-savings in the manufacturing process due to the need for only one mold. The hoist assembly and casing therefor are a simple and effective solution for raising tree stands and the like.

Accordingly, the present invention is directed to a hoist assembly which comprises: (a) a casing having a lower end, an aperture formed through the casing and an interior chamber defined in the casing, the aperture for receiving a fastener member therethrough for supporting the casing on a tree at a predetermined height, the interior chamber being open at the lower end of the casing; (b) a pulley mechanism including (i) a pulley rotatably mounted to and disposed within the interior chamber of the casing between the aperture and lower end of the casing, and (ii) a cable having opposite first and second end portions and being entrained over the pulley and extending downwardly through the interior chamber and exteriorly of the lower end of the casing, the first opposite end portion for attachment of an item thereto and the second opposite end portion for a user to grip for pulling the second opposite end portion downward to thereby rotate the pulley in a first direction and raise the item attached to the first opposite end portion; and (c) a latch mechanism including (1) a latching pawl pivotally mounted to and disposed within the interior chamber of the casing and being movable between a locked position and an unlocked position, the latching pawl in the locked position engaging and wedging the cable against the pulley so as to prevent the cable and therewith the pulley from moving in a second direction opposite the first direction and thereby retain the item attached to the first opposite end portion of the cable in place, the latching pawl in the unlocked position being shifted away from the cable such that the cable and the item are thereby free to move, an (ii) means for moving the latching pawl between the locked position and unlocked position.

More particularly, the casing has an upper end spaced opposite the lower end and a pair of spaced opposite sides extending between the upper and lower ends. The aperture of the casing is spaced below the upper end of the casing but disposed closer to the upper end than to the lower end of the casing and approximately halfway between the opposite sides of the casing. The casing also has a centering recess formed therein in communication with the aperture for receiving a portion of the fastener member therein for balancing the casing on the fastener member. The casing further has a pair of spaced apart openings at the lower end of the casing for passage of the cable therethrough.

The present invention is also directed to the casing for the hoist assembly. The casing comprises: (a) a pair of identical mateable front and rear casing halves; and (b) means for fastening the front and rear casing halves together in a mated relationship; (c) the front and rear casing halves in the mated relationship together forming a lower end of the casing and an interior chamber open at the lower end of the casing; (d) the front and rear halves also including first means for mounting the pulley mechanism within the interior chamber and second means for mounting the latch mechanism within the interior chamber.

More particularly, the front and rear casing halves in the mated relationship together define the aperture for receiving a fastener member therethrough for supporting the casing on a tree at a predetermined height and the centering recess in communication with the aperture for receiving a portion of the fastener member therein for balancing the casing on the fastener member. The front and rear casing halves in the mated relationship together define the pair of spaced apart openings at lower end portions of the front and rear casing halves for passage of the cable of the pulley mechanism therethrough. Each of the front and rear casing halves includes a main wall and a continuous side wall. The main wall has an exterior surface, an interior surface, a pair of diagonally opposite first and second corners, a pair of diagonally opposite third and fourth corners and a periphery. The side wall is mounted to and extends outwardly from the interior surface at the periphery of the main wall. The first means for mounting the pulley of the pulley mechanism within the interior chamber and the second means for mounting the latch mechanism within the interior chamber are formed on the interior surfaces of the front and rear casing halves.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is an enlarged side elevational view of the hoist assembly of FIG. 1 showing a casing, a pulley mechanism and a latch mechanism of the assembly with a portion of the casing broken away.

FIG. 3 is a sectional view of the hoist assembly taken along lines 3—3 of FIG. 2.

FIG. 4 is an enlarged detailed view of the hoist assembly of FIG. 2 showing portions of the pulley mechanism and the latch mechanism with a latching pawl of the latch mechanism shown in a locked position and a latching pin of the latch mechanism in a first position in solid line form where the latching pawl is engaging a cable of the pulley mechanism and with the latching pawl in an unlocked position and the latching pin in a second position in broken line form where the latching pawl is shifted away from the cable of the pulley mechanism.

FIG. 5 is an exploded perspective view of the hoist assembly of FIG. 2.

FIG. 6 is an enlarged sectional view of the hoist assembly taken along lines 6—6 of FIG. 2 showing the latching pin of the latch mechanism in the first position in solid line form and in the second position in broken line form angularly displaced from the first position.

DETAILED DESCRIPTION OF THE INVENTION

Figure 1:
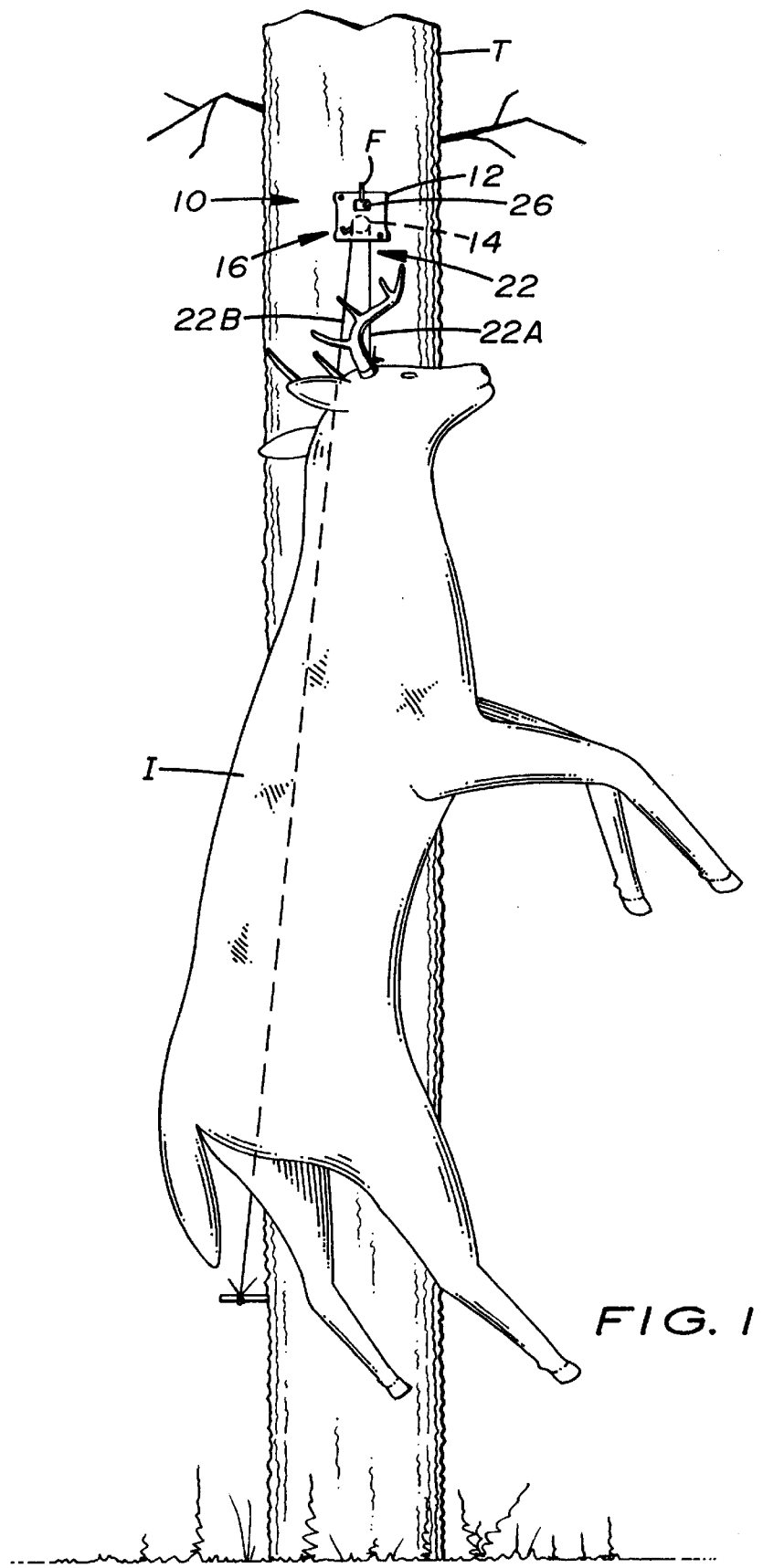
FIG. 1 is a perspective view of a tree stand hoist assembly of the present invention supported on a tree and employed in raising a deer alongside the tree.

Referring to the drawings and particularly to FIGS. 1, 2 and 5, there is illustrated a tree stand hoist assembly, generally designated 10, of the present invention. Basically, the hoist assembly 10 includes a casing 12, a pulley mechanism 14 and a latch mechanism 16. The casing 12 has opposite upper and lower ends 12A, 12B and an interior chamber 18. The interior chamber 18 is open at the lower end 12B of the casing 12. The casing 12 also has a pair of spaced opposite sides 12C extending between the upper and lower ends 12A, 12B.

The pulley mechanism 14 includes a pulley 20 and a cable 22. The pulley 20 is rotatably mounted to and disposed within the interior chamber 18 of the casing 12. The cable 22 has opposite first and second end portions 22A, 22B and is entrained over the pulley 20 and extends downwardly through the interior chamber 18 and exteriorly of the lower end 12B of the casing 12. The first opposite end portion 22A of the cable 22 is for attachment of an item I, such as a deer, as shown in FIG. 1, thereto. The second opposite end portion 22B of the cable 22 is for a user (not shown) to grip for pulling the second opposite end portion 22B downward to thereby rotate the pulley in a first direction D1 and raise the item I attached to the first opposite end portion 22A.

The latch mechanism 16 includes a latching pawl 24 and means for moving the latching pawl 24. The latching pawl 24 is pivotally mounted to and disposed within the interior chamber 18 of the casing 12. The latching pawl 24 is movable between a locked position, as shown in solid line form in FIGS. 2 and 4, and an unlocked position, as shown in broken line form in FIG. 4. The latching pawl 24 in the locked position engages and wedges the cable 22 of the pulley mechanism 14 against the pulley 20 of the pulley mechanism 14 and thereby prevents the cable 22 from moving in a second direction D2 opposite the first direction D1 and thereby retains the item I attached to the first opposite end portion 22A of the cable 22 in place. The latching pawl 24 in the unlocked position is shifted away from the cable 22 such that the cable 22 and the item I are free to move. The moving means is, particularly, for moving the latching pawl 24 between the locked position and the unlocked position.

In accordance with the present invention, the casing 12 has means in the form of an aperture 26 formed through the casing 12 for facilitating the supporting of the casing 12 on a tree T at a predetermined height, such as seen in FIG. 1. The aperture 26 is sized for receiving therethrough a fastener member F, such as a hook, step peg or the like, attached to the tree T for supporting the casing 12 on the tree T. The aperture 26 has a substantially rectangular configuration with rounded corners and is spaced below the upper end 12A of the casing 12 but disposed closer to the upper end 12A than to the lower end 12B of the casing 12. Also, the aperture 26 is disposed approximately halfway between the opposite sides 12C of the casing 12. The casing 12 also has a centering recess 28 formed through the casing 12 in communication with the aperture 26 for receiving a portion of the fastener member F therein for balancing the casing 12 on the fastener member F. The centering recess 28 is defined on top of the aperture 26 and is spaced from but disposed closer to the upper end 12A of the casing 12 than is the aperture 26. The centering recess 28 has a substantially semicircular configuration for mating with a rounded portion of the fastener member F also having a substantially circular configuration.

Referring now to FIGS. 1 to 3 and 5, the casing 12 has a substantially rectangular configuration with the opposite upper and lower ends 12A, 12B and opposite sides 12C being connected so as to form the four corners 12D. The upper and lower ends 12A, 12B have substantially the same lengths. The lengths of the opposite sides 12C are substantially the same but slightly less than the lengths of the upper and lower ends 12A, 12B. The corners 12D are rounded and protrude slightly from the casing 12. The casing 12 defines a pair of spaced apart openings 30 at the lower end 12B of the casing 12 for passage of the cable 22 of the pulley mechanism 14 therethrough. Each opening 30 has a substantially rectangular configuration and is spaced from but disposed closer to a respective one of the sides 12C than to the other of the sides 12C of the casing 12 and disposed closer to the respective one side 12C than to the other opening 30.

Also, in accordance with the present invention, the casing 12 has a pair of identical mating front and rear casing halves 32, 34. Each of the front and rear casing halves 32, 34 includes a main wall 36 and a continuous side wall 38. Also, the casing 12 includes means for detachably fastening the halves 32, 34 together in the form of a pair of opposite first and second seats 40, a pair of opposite first and second lugs 42, a pair of opposite first and second receptacles 44 and a plurality of fasteners 46. The main wall 36 has an exterior surface 36A, an interior surface 36B, a pair of diagonally opposite first and second corners 36C, a pair of diagonally opposite third and fourth corners 36D, and a periphery 36E.

The main wall 36 has a substantially rectangular configuration. The corners 36C, 36D are rounded and protrude slightly from each of the front and rear casing halves 32, 34. The side wall 38 is mounted to and extends outwardly from the interior surface 36B at the periphery 36E of the main wall 36 and has a height substantially less than the width of the main wall 36. The main walls 36 and continuous side walls 38 of the respective front and rear casing halves 32, 34 together define the interior chamber 18 therebetween. Each side wall 38 defines half of each of the openings 30 at the lower end 12B of the casing 12.

The first and second seats 40 are identical to the other and have generally circular configurations. Each of the first and second seats 40 defines an opening 52 having a generally circular configuration. The first seat 40 is formed on and extends inwardly from the exterior surface 36A spaced from but disposed adjacent to the first corner 36C of the main wall 36. The second seat 40 is formed on and extends inwardly from the exterior surface 36A spaced from but disposed adjacent to the second corner 36C diagonally opposite from the first corner 36C of the main wall 36. The first and second lugs 42 are identical to the other and have generally circular configurations. Each of the first and second lugs 42 defines an opening 54 having a generally circular configuration. The first lug 42 is formed on and extends outwardly from the interior surface 36B spaced from but disposed adjacent to the first corner 36C of the main wall 36 and adjacent to the first seat 40 such that the opening 54 of the first lug 42 is aligned with the opening 52 of the first seat 40. The second lug 42 is formed on and extends outwardly from the interior surface 36B spaced from but disposed adjacent to the second corner 36C diagonally opposite from the first corner 36C of the main wall 36 and adjacent to the second seat 40 such that the opening 54 of the second lug 42 is aligned with the opening 52 of the second seat 40. Each of the first and second lugs 42 has a height less than the height of the side wall 38.

The first and second receptacles 44 are identical to the other and have generally cylindrical configuration. Each of the first and second receptacles 44 defines an internally threaded hole 56. The internally threaded hole 56 has a substantially circular configuration. The first receptacle 44 is formed on and extends outwardly from the interior surface 36B spaced from but disposed adjacent to the third corner 36D of the main wall 36. The second receptacle 44 is formed on and extends outwardly from the interior surface 36B spaced from but disposed adjacent to the fourth corner 36D diagonally opposite from the third corner 36D of the main wall 36. Each of the first and second receptacles 44 has a height greater than the height of the side wall 38. The internally threaded holes 56 of the first receptacles 44 of each of the front and rear casing halves 32, 34 are alignable with the openings 54 of the first lugs 42 and the openings 52 of the first seats 40 of the other of the front and rear casing halves 32, 34. The internally threaded holes 56 of the second receptacles 44 of each of the front and rear casing halves 32, 34 are alignable with the openings 54 of the second lugs 42 and the openings 52 of the second seats 40 of the other of the front and rear casing halves 32, 34. The first and second receptacles 44 also has respective pairs of braces 44A, 44B formed on and extend upwardly from the interior surface 36B of the main wall 36 and between the first and second receptacles 44 and the side wall 38. The braces 44A, 44B are disposed in generally perpendicular relation to one another and have lengths greater than the widths thereof and heights less than the height of the first and second receptacles 44 and greater than the height of the side wall 38.

The threaded fasteners 46, such as screw fasteners or the like, preferably are four in number. Each fastener 46 is seated on one of the first and second seats 40 of the front and rear casing halves 32, 34 and inserted through the opening 52 of the one of the first and second seats 40 and through the opening 54 of the adjacent one of the first and second lugs 42 of the front and rear casing halves 32, 34 and threadably insertable within the internally threaded hole 56 of one of the first and second receptacles 44 of the other of the front and rear casing halves 32, 34 for securing the front and rear casing halves 32, 34 to one another.

Further, the casing 12 includes means for mounting the pulley mechanism 14 within the interior chamber 18 of the casing 12 in the form of a central lug 60 formed on each of the front and rear casing halves 32, 34 and having a substantially circular configuration and a central pin 62 for seating at one end in the central lug 60 on a respective one of the front and rear casing halves 32, 34. The central lug 60 forms a hole 64 having a generally circular configuration. The central lug 60 is formed on and extends outwardly from the interior surface 36B of the main wall 36 spaced from but disposed closer to the lower end 12B than to the upper end 12A of the casing 12. The central lug 60 has a height less than the height of one of the first and second lugs 42. The central lug 60 also has a diameter greater than the diameter of one of the first and second lugs 42.

The central pin 62 has a substantially cylindrical configuration and a length substantially greater than the height of one of the first and second receptacles 44 of the front and rear casing halves 32, 34. The central pin 62 is insertable within the holes 64 of the central lugs 60 of the front and rear casing halves 32, 34 such that the pulley 20 of the pulley mechanism 14 is rotatably mountable on the central pin 62 and between the central lugs 60 of the front and rear halves 32, 34. The hole 64 of the central lug 60 has a diameter slightly greater than the diameter of the central pin 62 for snugly fitting the central pin 62 therein.

Still further, the casing 12 includes means for mounting the latch mechanism 16 within the interior chamber 18 of the casing 12 in the form of a pair of opposite first and second side lugs 66, 68 having substantially circular configurations and a side pin 70. Each of the first and second side lugs 66, 68 defines a hole 72. The hole 72 has a substantially circular configuration. The first side lug 66 is formed on and extends outwardly from the interior surface 36B of the main wall 36 spaced from but disposed adjacent to the side wall 38 and spaced from but disposed closer to the lower end 12B than to the upper end 12A of the casing 12. The second side lug 68 is formed on and extends outwardly from the interior surface 36B of the main wall 36 spaced from but disposed adjacent to the side wall 38 opposite from the first side lug 66 and spaced from but closer to the lower end 12B than to the upper end 12A of the casing 12. The first and second side lugs 66, 68 have substantially the same height which is greater than the height of one of the first and second lugs 42 and less than the height of the side wall 38.

The side pin 70 is similar to the central pin 62 and has a substantially cylindrical configuration. The side pin 70 has a length substantially the same as the length of the central pin 62. Th side pin 70 is insertable at its opposite ends within the holes 72 of the first and second side lugs 66, 68 of the respective front and rear casing halves 32, 34 such that the latching pawl 24 of the latch mechanism 16 is pivotally mountable on the side pin 70 between the first and second side lugs 66, 68 of the front and rear casing halves 32, 34. Each hole 2 of the first and second side lugs 66, 68 has a diameter substantially the same as the diameter of the other and slightly greater than the diameter of the side pin 70 for snugly fitting with the side pin 70.

Each of the front and rear casing halves 32, 34 defines a slot 74 having a substantially arcuate configuration. The slot 74 also has opposite ends 74A, 74B. The end 74A of the slot 74 is dispose farther from an adjacent portion of the side wall 38 than is the end 74B of the slot 74. The slot 74 is disposed adjacent to the first side lug 66. The first side lug 66 defines a recess 66A adjacent to and conforming to the end 74B of the slot 74.

For forming the aperture 26, each of the front and rear casing halves 32, 34 includes an inner annular wall 76. The inner annular wall 76 would have a substantially rectangular configuration but for a top central protrusion 76A. The inner annular wall 76 as rounded corners. The top central protrusion 76A has a substantially semicircular configuration. The inner annular wall 76 is mounted to and extends outwardly from the interior surface 36B of the main wall 36 and at the top central protrusion 76A is mounted to an adjacent portion of the side wall 38. The inner annular wall 76 has a height substantially the same as the height of the side wall 38. The inner annular walls 76 of the front and rear casing halves 32, 34 together form the aperture 26 and the centering recess 28. Also, the inner annular walls 76 of the front and rear halves 32, 34 together separate the aperture 26 and the centering recess 28 from the interior chamber 18 of the casing 12.

Each of the front and rear casing halves 32, 34 includes a first pair of spaced apart interior pins 78A, 78B and a second pair of spaced apart interior pins 80A, 80B. The first and second interior pins 78A, 78B and 80A, 80B are identical to each other. Each of the first and second interior pins 78A, 78B and 80A, 80B has a substantially cylindrical configuration and lengths greater than the height of one of the first and second side lugs 66, 68 and less than the height of one of the first and second receptacles 44. Each of the first interior pins 78A, 78B is formed on and extends outwardly from the interior surface 36B of the main wall 36 spaced from the side wall 38 but disposed closer to one of the sides 12C than to the other of the sides 12C of the casing 12. The first interior pins 78A, 78B are disposed adjacent to the first side lug 66. The first interior pin 78A is disposed closer to the first side lug 66 than is the first interior pin 78B. Each of the second interior pins 80A, 80B is formed on and extends outwardly from the interior surface 36B of the main wall 36 spaced from the side wall 38 but disposed closer to one of the sides 12C than to the other of the sides 12C of the casing 12. The second interior pins 80A, 80B are disposed adjacent to the second side lug 68. The second interior pin 80A is disposed closer to the second side lug 68 than is the second interior pin 80B.

The pulley 20 and the cable 22 of the pulley mechanism 12 are any suitable and conventional types of pulley and cable. The pulley 20 has a rim 82 and a central transverse opening 84. The rim 82 has a substantially U-shaped transverse configuration. The central transverse opening 84 has a substantially circular configuration. The central transverse opening 84 has a diameter slightly greater than the diameter of the central pin 62 of the casing 12 for fitting the central pin 62 therethrough. The cable 22 may be a cord, rope or the like and is entrained about the rim 82 of the pulley 20.

Referring now to FIGS. 2 and 4 to 6, the latching pawl 24 of the latch mechanism 16 has a substantially triangular configuration and three corners 24A, 24B, 24C. The corner 24A of the latching pawl 24 is rounded. The latching pawl 24 has three edge sides 86, 88, 90 and opposite lateral sides 92, 94. The edge side 86 has a plurality of teeth 96 formed thereon which provide a grip surface for engaging the cable 22 of the pulley mechanism 12. The edge side 86 is disposed opposite from the rounded corner 24A and extends between the corners 24B, 24C. The other edge sides 88, 90 are substantially smooth. The length of the edge side 86 is greater than the length of the edge side 88 and less than the length of the edge side 90. The latching pawl 24 defines a first transverse opening 98 and a second transverse opening 100 each open at the lateral sides 92, 94. The first transverse opening 98 is spaced from but disposed adjacent to the rounded corner 24A and has a generally circular configuration. The first transverse opening 98 has a diameter slightly greater than the diameter of the side pin 72 of the casing 12 for fitting the side pin 72 therethrough. The second transverse opening 100 is spaced from the first transverse opening 98 and disposed adjacent to the edge side 90 approximately halfway between the rounded corner 24A and the corner 24B. The second transverse opening 100 has a substantially oblong configuration.

As best seen in FIG. 6, each of the lateral sides 92, 94 has first and second portions 92A, 92B and 94A, 94B. The first portions 92A, 94A are offset and raised relative to the second portions 92B, 94B. The first transverse opening 98 is open at the second portions 92B, 94B of the lateral sides 92, 94. The second transverse opening 100 is open at the second portion 92B adjacent to the first portion 92A of the lateral side 92 and open at the junction of the first and second portions 94A, 94B and disposed more in the second portion 94B than in the first portion 94A of the lateral side 94.

The latching pawl 24 has a transverse pin 102 of a substantially cylindrical configuration. The transverse pin 102 is formed on and extends outwardly from the second portion 92A of the lateral side 92. The transverse pin 102 has a height substantially the same as a height of the offset between the first and second portions 92A, 92B of the lateral side 92. The transverse pin 102 is spaced from but disposed adjacent to the edge side 88 closer to the corner 24C. The latching pawl 24 has a pair of transverse lugs 104. Each transverse lug 104 is formed on and extends outwardly from the first portion 92A of the lateral side 92. Each transverse lug 104 is substantially a mirror image of the other transverse lug 104. Each transverse lug 104 also has a height substantially the same as the height of the transverse pin 102 and the height of the offset between the first and second portions 92A, 92B of the lateral side 92. Each transverse lug 104 is spaced from the other and disposed adjacent to the second transverse opening 100. Each transverse lug 104 would have a substantially rectangular configuration but for a concave side adjacent to and conforming to the second transverse opening 100.

The moving means of the latch mechanism 16 includes a latching pin 106. The latching pin 106 has a substantially T-shaped configuration. The latching pin 106 has a first portion 106A and a second portion 106B. Each of the first and second portions 106A, 106B has a substantially cylindrical configuration. The first portion 106A and the second portion 106B are disposed in substantially perpendicular relation to one another. The length of the first portion 106A is greater than the length of the second portion 106B. The diameter of the first portion 106A is substantially the same as the diameter of the second portion 106B. The first portion 106A of the latching pin 106 is inserted through the second transverse opening 100 of the latching pawl 24. The second portion 106B of the latching pin 106 is captured between the first portion 92A of the lateral side 92 and the transverse lugs 104 on the lateral side 92 of the latching pawl 24. The diameter of the second portion 106B of the latching pin 106 is substantially the same as the height of the offset between the first and second portions 92A, 92B of the lateral side 92 and the height of each of the transverse lugs 104 of the latching pawl 24. The insertion of the first portion 106A of the latching pin 106 through the second transverse opening 100 of the latching pawl 24 and the capture of the second portion 106B of the latching pin 106 between the first portion 92A of the lateral side 92 and the transverse lugs 104 on the lateral side 92 of the latching pawl 24 mounts the latching pin 106 to the latching pawl 24. The first portion 106A of the latching pin 106 extends outwardly from and in transverse relation to the latching pawl 24 and through the slot 74 of one of the front and rear halves 32, 34 of the casing 12 so as to extend outwardly a sufficient distance beyond the one of the front and rear halves 32, 34 to allow the user to grip and to move the latching pin 106 between a first position and a second position. In the first position, the first portion 106A of the latching pin 106 is disposed closer to the end 74A of the slot 74, as shown in solid line form in FIGS. 4 and 6. In the second position, the first portion 106A of the latching pin 106 is disposed closer to the end 74B of the slot 74, as shown in broken line form in FIG. 4, and is angularly displaced from the first portion 106A in the first position, as shown in broken line form in FIG. 6. The latching pin 106 in the first position places the latching pawl 24 in the locked position, as shown in sold line form in FIGS. 2 and 4. The latching pin 106 in the second position places the latching pawl 24 in the unlocked position, as shown in broken line form in FIGS. 4 and 6. The latch mechanism 16 also includes a spring 108. The spring 108 is a coil spring or any other suitable type and has opposite ends 108A. Each of the ends 108A of the spring 108 has a hook-shaped configuration. One of the ends 108A of the spring 108 is hooked around the transverse pin 102 of the latching pawl 24 and is thereby connected to the latching pawl 24. The other of the ends 108A of the spring 108 is hooked around the second interior pin 80B of one of the front and rear halves 32, 34 and is thereby mounted to the one of the front and rear casing halves 32, 34 adjacent to the latching pawl 24 for biasing the latching pawl 24 to the locked position. The first portion 106A of the latching pin 106 extends through the slot 74 of the other of the front and rear halves 32, 34 opposite from the one of the front and rear halves 32, 34 to which the other of the ends 108A of the spring 108 is mounted and may be gripped by the user to operate the latching pawl 24.

Due to the employment of identical mating casing halves 32, 34 for the casing 12, only one mold is required for the manufacturing of the casing 12 by the use of conventional injection molding techniques.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A hoist assembly, comprising:
   (a) a casing having a pair of identical mateable front and rear casing halves, each of said front and rear casing halves including
      (i) a main wall having an exterior surface, an interior surface and a periphery,
      (ii) a side wall mounted to and extending outwardly from said interior surface at and about said periphery of said main wall,
      (iii) means for fastening said front and rear casing halves together with said side walls thereof disposed in a mated relationship with one another so as to form an interior chamber in said casing between said main walls and mated side walls of said front and rear casing halves and a lower end of said casing with said interior chamber being open through said mated side walls at said lower end of said casing,
      (iv) first means mounted on said main walls thereof for mounting a pulley mechanism within said interior chamber between said main walls and said mated side walls of said front and rear casing halves, and
      (v) second means mounted on said main walls thereof adjacent to said first means for mounting a latch mechanism within said interior chamber between said main walls and said mated side walls of said front and rear casing halves;
   (b) a pulley mechanism including
      (i) a pulley rotatably mounted to said first means of said casing and disposed within said interior chamber between said main walls and mated side walls of said front and rear casing halves of said casing, and
      (ii) a cable having opposite first and second end portions and being entrained over said pulley and extending downwardly through said interior chamber and exteriorly of said lower end of said casing, said first opposite end portion for attachment of an item thereto and said second opposite end portion for a user to grip for pulling said second opposite end portion downward to thereby rotate said pulley in a first direction and raise the item attached to said first opposite end portion; and
   (c) a latch mechanism including
      (i) a latching pawl pivotally mounted to said second means of said casing and disposed within said interior chamber between said main walls and mated side walls of said front and rear casing halves of said casing and being movable between a locked position and an unlocked position, said latching pawl in said locked position engaging and wedging said cable against said pulley so as to prevent said cable and therewith said pulley from moving in a second direction opposite said first direction and thereby retain the item attached to said first opposite end portion of said cable in place, said latching pawl in said unlocked position being shifted away from said cable such that said cable and the item are thereby free to move, and
      (ii) means for moving said latching pawl between said locked position and said unlocked position.

2. The assembly of claim 1 wherein said casing also has a pair of spaced apart openings formed at said lower end of said casing for passage of said cable therethrough.

3. The assembly of claim 1 wherein said latch mechanism further includes a spring connected to said latching pawl and mounted to said casing adjacent to said latching pawl for biasing said latching pawl to said locked position.

4. The assembly of claim 1 wherein said casing also has an aperture formed through said casing for receiving a fastener member therethrough for supporting said casing on tree at a predetermined height.

5. The assembly of claim 4 wherein:
   said casing also has an upper end spaced opposite said lower end and a pair of spaced opposite sides extending between said upper and lower ends; and
   said aperture of said casing is spaced below said upper end of said casing but disposed closer to said upper end than to said lower end of said casing and approximately halfway between said opposite sides of said casing.

6. The assembly of claim 4 wherein said casing also has a centering recess formed therein in communication with said aperture for receiving a portion of the fastener member therein for balancing said casing on the fastener member.

7. A hoist assembly, comprising:
(a) a casing having a lower end, an aperture formed through said casing and an interior chamber defined in said casing, said aperture for receiving a fastener member therethrough for supporting said casing on a tree at a predetermined height, said interior chamber being open at said lower end of said casing, said casing also having a pair of identical mating front and rear casing halves, each of said front and rear casing halves including
  (i) a main wall having an exterior surface, an interior surface, a pair of diagonally opposite first and second corners, a pair of diagonally opposite third and fourth corners and a periphery,
  (ii) a continuous side wall mounted to and extending outwardly from said interior surface at said periphery of said main wall,
  (iii) a pair of opposite first and second seats each defining an opening, said first seat formed on and extending inwardly from said exterior surface spaced from but disposed adjacent to said first corner of said main wall, said second seat formed on and extending inwardly from said exterior surface spaced from but disposed adjacent to said second corner diagonally opposite from said first corner of said main wall,
  (iv) a pair of opposite first and second lugs each defining an opening, said first lug formed on and extending outwardly from said interior surface spaced from but disposed adjacent to said first corner of said main wall and adjacent to said first seat such that said opening of said first lug is aligned with said opening of said first seat, said second lug formed on and extending outwardly from said interior surface spaced from but disposed adjacent to said second corner opposite from said first corner of said main wall and adjacent to said second seat such that said opening of said second lug is aligned with said opening of said second seat, and
  (v) a pair of opposite first and second receptacles each defining an internally threaded hole, said first receptacle formed on and extending outwardly from said interior surface spaced from but disposed adjacent to said third corner of said main wall, said second receptacle formed on and extending outwardly from said interior surface spaced from but disposed adjacent to said fourth corner opposite from said third corner of said main wall, said internally threaded holes of said first receptacles of each of said front and rear casing halves being alignable with said openings of said first lugs and said first seats of the other of said front and rear casing halves, said internally threaded holes of said second receptacles of each of said front and rear halves being alignable with said openings of said second lugs and said second seats of the other of said front and rear casing halves;
(b) a pulley mechanism including
  (i) a pulley rotatably mounted to and disposed within said interior chamber of said casing between said aperture and said lower end of said casing, and
  (ii) a cable having opposite first and second end portions and being entrained over said pulley and extending downwardly through said interior chamber and exteriorly of said lower end of said casing, said first opposite end portion for attachment of an item thereto and said second opposite end portion for a user to grip for pulling said second opposite end portion downward to thereby rotate said pulley in a first direction and raise the item attached to said first opposite end portion; and
(c) a latch mechanism including
  (i) a latching pawl pivotally mounted to and disposed within said interior chamber of said casing and being movable between a locked position and an unlocked position, said latching pawl in said locked position engaging and wedging said cable against said pulley so as to prevent said cable and therewith said pulley from moving in a second direction opposite said first direction and thereby retain the item attached to said first opposite end portion of said cable in place, said latching pawl in said unlocked position being shifted away from said cable such that said cable and the item are thereby free to move, and
  (ii) means for moving said latching pawl between said locked position and said unlocked position.

8. The assembly of claim 7 wherein said casing also includes a plurality of externally threaded fasteners each seated on one of said first and second seats of said front and rear casing halves and inserted through said opening of the one of said first and second seats and through said opening of the adjacent one of said first and second lugs of said front and rear casing halves and threadably insertable within said internally threaded hole of one of said first and second receptacles of the other of said front and rear casing halves for securing said front and rear casing halves to one another.

9. The assembly of claim 7 wherein:
said casing has an upper end;
each of said front and rear casing halves includes a central lug defining a hole, said central lug formed on and extending outwardly from said interior surface of said main wall and being spaced above but disposed closer to said lower end than to said upper end of said casing; and
said casing has a central pin insertable within said holes of said central lugs of said front and rear casing halves such that said pulley is rotatably mounted on said central pin between said central lugs of said front and rear casing halves.

10. The assembly of claim 7 wherein:
said casing has an upper end;
each of said front and rear casing halves includes a pair of opposite first and second side lugs each defining a hole, said first side lug formed on and extending outwardly from said interior surface of said main wall and being spaced from but disposed adjacent to said side wall and spaced above but disposed closer to said lower end than to said upper end of said casing, said second side lug formed on and extending outwardly from said interior surface of said main wall and being spaced from but disposed adjacent to said side wall opposite from said first side lug and spaced above but disposed closer to said lower end than to said upper end of said casing; and
said casing has a side pin insertable within said hole of said first side lug of one of said front and rear halves of said casing and within said hole of said second side lug of the other of said front and rear casing halves such that said latching pawl of said latch mechanism is pivotally mounted on said side pin between said first and second side lugs of said front and rear casing halves.

11. The assembly of claim 10 wherein each of said front and rear casing halves has a slot formed therein adjacent to said first side lug of said front and rear casing halves.

12. The assembly of claim 11 wherein said moving means of said latch mechanism includes a latching pin mounted to and extending in transverse relation to said latching pawl and outwardly therefrom through said slot of one of said front and rear casing halves so as to extend outwardly a sufficient distance beyond the one of said front and rear casing halves to allow the user to grip and to move said latching pin between a first position and a second position, said latching pin in said first position placing said latching pawl in said locked position, said latching pin in said second position placing said latching pawl in said unlocked position.

13. The assembly of claim 7 wherein said casing also has a centering recess formed therein in communication with said aperture for receiving a portion of the fastener member there in for balancing said casing on the fastener member.

14. The assembly of claim 13 wherein each of said front and rear casing halves includes an inner annular wall mounted to and extending outwardly from said interior surface of said main wall such that together with said inner annular wall of the other of said front and rear casing halves forms said aperture and said centering recess of said casing.

15. A hoist assembly, comprising:
(a) a casing having a pair of identical mating front and rear casing halves defining a lower end of said casing and an interior chamber of said casing and being open at said lower end of said casing, each of said front and rear casing halves including
   a main wall having an exterior surface, an interior surface, a pair of diagonally opposite first and second corners, a pair of diagonally opposite third and fourth corners and a periphery,
   (ii) a continuous side wall mounted to and extending outwardly from said interior surface at said periphery of said main wall,
   (iii) a pair of opposite first and second seats each defining an opening, said first seat formed on and extending inwardly from said exterior surface spaced from but disposed adjacent to said first corner of said main wall, said second seat formed on and extending inwardly from said exterior surface spaced from but disposed adjacent to said second corner diagonally opposite from said first corner of said main wall,
   (iv) a pair of opposite first and second lugs each defining an opening, said first lug formed on and extending outwardly from said interior surface spaced from but disposed adjacent to said first corner of said main wall and adjacent to said first seat such that said opening of said first lug is aligned with said opening of said first seat, said second lug formed on and extending outwardly from said interior surface spaced from but disposed adjacent to said second corner opposite from said first corner of said main wall and adjacent to said second seat such that said opening of said second lug is aligned with said opening of said second seat, and
   (v) a pair of opposite first and second receptacles each defining an internally threaded hole, said first receptacle formed on and extending outwardly from said interior surface spaced from but disposed adjacent to said third corner of said main wall, said second receptacle formed on and extending outwardly from said interior surface spaced from but disposed adjacent to said fourth corner opposite from said third corner of said main wall, said internally threaded holes of said first receptacles of each of said front and rear casing halves being alienable with said openings of said first lugs and said first seats of the other of said front and rear casing halves, said internally threaded holes of said second receptacles of each of said front and rear halves being alignable with said openings of said second lugs and said second seats of the other of said front and rear casing halves;
(b) a pulley mechanism including
   (i) a pulley rotatably mounted to and disposed within said interior chamber of said casing between said front and rear casing halves, and
   (ii) a cable having opposite first and second end portions and being entrained over said pulley and extending downwardly through said interior chamber and exteriorly of said lower end of said casing, said first opposite end portion for attachment of an item thereto and said second opposite end portion for a user to grip for pulling said second opposite end portion downward to thereby rotate said pulley in a first direction and raise the item attached to said first opposite end portion; and
(c) a latch mechanism including
   (i) a latching pawl pivotally mounted to and disposed within said interior chamber of said casing between said front and rear casing halves and being movable between a locked position and an unlocked position, said latching pawl in said locked position engaging and wedging said cable against said pulley so as to prevent said cable and therewith said pulley from moving in a second direction opposite said first direction and thereby retain the item attached to said first opposite end portion of said cable in place, said latching pawl in said unlocked position being shifted away from said cable such that said -cable and the item are thereby free to move, and
   (ii) means for moving said latching pawl between said locked position and said unlocked position.

16. The assembly of claim 15 wherein said casing has means for supporting said casing on a tree at a predetermined height.

17. The assembly of claim 15 wherein said casing also includes a plurality of externally threaded fasteners each seated on one of said first and second seats of said front and rear casing halves and inserted through said opening of the one of said first and second seats and through said opening of the adjacent one of said first and second lugs of said front and rear casing halves and threadably insertable within said internally threaded hole of one of said first and second receptacles of the other of said front and rear casing halves for securing said front and rear casing halves to one another.

18. The assembly of claim 15 wherein:
said casing has an upper end;
each of said front and rear casing halves includes a central lug defining a hole, said central lug formed on and extending outwardly from said interior surface of said main wall and being spaced above but disposed closer to said lower end than to said upper end of said casing; and
said casing has a central pin insertable within said holes of said central lugs of said front and rear casing halves such that said pulley is rotatably mounted on said central pin between said central lugs of said front and rear casing halves.

19. The assembly of claim 15 wherein:

said casing has an upper end;

each of said front and rear casing halves includes a pair of opposite first and second side lugs each defining a hole, said first side lug formed on and extending outwardly from said interior surface of said main wall and being spaced from but disposed adjacent to said side wall and spaced above but disposed closer to said lower end than to said upper end of said casing, said second side lug formed on and extending outwardly from said interior surface of said main wall and being spaced from but disposed adjacent to said side wall opposite from said first side lug and spaced above but disposed closer to said lower end than to said upper end of said casing; and said casing has a side pin insertable within said hole of said first side lug of one of said front and rear halves of said casing and within said hole of said second side lug of the other of said front and rear casing halves such that said latching pawl of said latch mechanism is pivotally mounted on said side pin between said first and second side lugs of said front and rear casing halves.

20. The assembly of claim 19 wherein each of said front and rear casing halves has a slot formed therein adjacent to said first side lug of said front and rear casing halves.

21. The assembly of claim 20 wherein said moving means of said latch mechanism includes a latching pin mounted to and extending in transverse relation to said latching pawl and outwardly therefrom through said slot of one of said front and rear casing halves so as to extend outwardly a sufficient distance beyond the one of said front and rear casing halves to allow the user to grip and to move said latching pin between a first position and a second position, said latching pin in said first position placing said latching pawl in said locked position, said latching pin in said second position placing said latching pawl in said unlocked position.

22. A casing for a hoist assembly, said casing comprising:
 (a) a pair of identical mateable front and rear casing halves, each of said front and rear casing halves including
   (i) a main wall having an exterior surface, an interior surface and a periphery, and
   (ii) a side wall mounted to and extending outwardly from said interior surface at and about said periphery of said main wall; and
 (b) means for fastening said front and rear casing halves together with said side walls thereof disposed in a mated relationship with one another so as to form an interior chamber in said casing between said main walls and mated side walls of said front and rear casing halves;
 (c) said front and rear casing halves with said side walls thereof in said mated relationship also forming a lower end of said casing such that said interior chamber is open through said mated side walls at said lower end of said casing;
 (d) said front and rear halves also including
   (i) first means mounted on said main walls thereof for mounting a pulley mechanism within said interior chamber between said main walls and said mated side walls of said front and rear casing halves, and
   (ii) second means mounted on said main walls thereof for mounting a latch mechanism within said interior chamber between said main walls and said mated side walls of said front and rear casing halves.

23. The casing of claim 22 wherein said front and rear casing halves in said mated relationship together define an aperture for receiving a fastener member therethrough for supporting said casing on a tree at a predetermined height.

24. The casing of claim 23 wherein:

each of said front and rear casing halves includes an upper end portion and opposite side portions; and said aperture of said front and rear casing halves is spaced from said upper end portions of said front and rear halves but disposed closer to said upper end portions than to said lower end portions of said front and rear casing halves and approximately halfway between said opposite side portions of said front and rear casing halves.

25. The casing of claim 23 wherein said front and rear casing halves in said mated relationship together define a centering recess in communication with said aperture for receiving a portion of the fastener member therein for balancing said casing on the fastener member.

26. The casing of claim 22 wherein said front and rear casing halves in said mated relationship together define a pair of spaced apart openings at said lower end portions thereof for passage of a cable of the pulley mechanism therethrough.

27. The casing of claim 22 wherein said main wall of each of said front and rear casing halves has a pair of diagonally opposite first and second corners and a pair of diagonally opposite third and fourth corners.

28. The casing of claim 27 wherein said means for fastening said front and rear casing halves in said mated relationship includes:
 a pair of opposite first and second seats each defining an opening, said first seat formed on and extending inwardly from said exterior surface spaced from but disposed adjacent to said first corner of said main wall, said second seat formed on and extending inwardly from said exterior surface spaced from but disposed adjacent to said second corner diagonally opposite from said first corner of said main wall;
 a pair of opposite first and second lugs each defining an opening, said first lug formed on and extending outwardly from said interior surface spaced from but disposed adjacent to said first corner of said main wall and adjacent to said first seat such that said opening of said first lug is aligned with said opening of said first seat, said second lug formed on and extending outwardly from said interior surface spaced from but disposed adjacent to said second corner diagonally opposite from said first corner of said main wall and adjacent to said second seat such that said opening of said second lug is aligned with said opening of said second seat; and
 a pair of opposite first and second receptacles each defining an internally threaded hole, said first receptacle formed on and extending outwardly from said interior surface spaced from but disposed adjacent to said third corner of said main wall, said second receptacle formed on and extending outwardly from said interior surface spaced from but disposed adjacent to said fourth corner opposite from said third corner of said main wall, said internally threaded holes of said first receptacles of each of said front and rear halves being alignable with said openings of said first lugs and said first seats of the other of said front and rear halves, said internally threaded holes of said second receptacles of each of said front and rear halves being alignable with said openings of said second lugs and said second seats of the other of said front and rear halves.

29. The casing of claim 28 wherein said means for fastening said front and rear casing halves in said mated relationship further includes a plurality of externally threaded fasteners each seated on one of said first and second seats of said front and rear halves and inserted through said opening of the one of said first and second seats and through said opening of the adjacent one of said first and second lugs of said front and rear halves and threadably insertable within said internally threaded hole of one of said first and second receptacles of the other of said front and rear halves for securing said front and rear halves to one another.

30. The casing of claim 27 wherein:

said first means for mounting said pulley mechanism includes a central lug on each of said front and rear casing halves defining a hole, said central lug formed on and extending outwardly from said interior surface of said main wall spaced from but disposed closer to said lower end portion than to an upper end portion of each of said front and rear casing halves; and a central pin is insertable within said holes of said central lugs of said front and rear casing halves in said mated relationship such that a pulley of the pulley mechanism is rotatably mountable on said central pin and between said central lugs of said front and rear casing halves in said mated relationship.

31. The casing of claim 27 wherein:

said second means for mounting said latching mechanism includes a pair of opposite first and second side lugs on each of said front and rear casing halves defining a hole, said first side lug formed on and extending outwardly from said interior surface of said main wall spaced from but disposed adjacent to said side wall and spaced from but disposed closer to said lower end portions than to upper end portions of said front and rear casing halves, said second side lug formed on and extending outwardly from said interior surface of said main wall spaced from but disposed adjacent to said side wall opposite from said first side lug and spaced from but disposed closer to said lower end portions than to upper end portions of said front and rear casing halves; and a side pin is insertable within said hole of said first side lug of one of said front and rear casing halves and within said hole of said second side lug of the other of said front and rear casing halves such that a latching pawl of the latch mechanism is pivotally mountable on said side pin and between said first and second side lugs of said front and rear casing halves.

32. The casing of claim 31 wherein each of said front and rear casing halves defines a slot adjacent to said first side lug of said first and rear casing halves, said slot of one of said front and rear casing halves for receiving a latching pin of the latch mechanism therethrough which extends outwardly a sufficient distance beyond the one of said front and rear casing halves so as to allow a user to grip and to move the latching pin for thereby moving the latching pawl of the latch mechanism.

33. The casing of claim 27 wherein:

said front and rear casing halves in said mated relationship together form an aperture for receiving a fastener member therethrough for supporting said casing on a tree at a predetermined height; and said front and rear casing halves in said mating relationship together form a centering recess in communication with said aperture for receiving a portion of the fastener member therein for balancing said casing on the fastener member.

34. The casing of claim 33 wherein each of said front and rear casing halves includes an inner annular wall mounted to and extending outwardly from said interior surface of said main wall and together with said inner annular wall of the other of said front and rear casing halves forming said aperture and said centering recess of said front and rear casing halves.

* * * * *